(12) United States Patent
Hynous

(10) Patent No.: US 8,451,459 B2
(45) Date of Patent: May 28, 2013

(54) METHOD AND SYSTEM FOR INSPECTING BLADE TIP CLEARANCE

(75) Inventor: Andrew Thomas Hynous, Greenville, SC (US)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 13/073,724

(22) Filed: Mar. 28, 2011

(65) Prior Publication Data

US 2012/0069355 A1 Mar. 22, 2012

Related U.S. Application Data

(63) Continuation-in-part of application No. 12/262,815, filed on Oct. 31, 2008, now Pat. No. 7,916,311.

(51) Int. Cl.
*G01B 11/14* (2006.01)

(52) U.S. Cl.
CPC ..................... *G01B 11/14* (2013.01)
USPC ........................ 356/625; 356/614

(58) Field of Classification Search
CPC ....................................... G01B 11/13
USPC ................................ 356/600–625
See application file for complete search history.

(56) References Cited

U.S. PATENT DOCUMENTS

| | | | |
|---|---|---|---|
| 4,357,104 A | 11/1982 | Davinson | |
| 4,596,460 A * | 6/1986 | Davinson | 356/3.06 |
| 4,765,742 A | 8/1988 | Davinson | |
| 5,203,673 A | 4/1993 | Evans | |
| 5,739,524 A | 4/1998 | Fally | |
| 6,575,011 B1 * | 6/2003 | Busby et al. | 73/7 |
| 6,678,060 B2 | 1/2004 | Heyworth | |
| 6,717,418 B2 | 4/2004 | Orenstein | |
| 6,863,495 B2 | 3/2005 | Halliwell et al. | |
| 7,086,233 B2 | 8/2006 | Chehab et al. | |
| 7,341,426 B2 | 3/2008 | Schwarz et al. | |
| 7,388,680 B2 | 6/2008 | Heyworth | |
| 7,465,145 B2 | 12/2008 | Kane | |
| 2005/0089401 A1 | 4/2005 | Phipps | |
| 2007/0005294 A1 | 1/2007 | Andarawis et al. | |
| 2008/0089775 A1 | 4/2008 | Lee et al. | |
| 2008/0149049 A1 | 6/2008 | Mollmann et al. | |
| 2008/0206039 A1 | 8/2008 | Kane | |
| 2008/0218181 A1 | 9/2008 | Ducheminsky et al. | |
| 2008/0267769 A1 | 10/2008 | Schwarz et al. | |

OTHER PUBLICATIONS

EPO Foreign Search Report dated Feb. 26, 2010 for application No. 09174105.8-2213.

* cited by examiner

*Primary Examiner* — Michael P Stafira
(74) *Attorney, Agent, or Firm* — Armstrong Teasdale LLP

(57) ABSTRACT

A method for use in inspecting a blade tip clearance is provided. The method includes providing a plurality of rotor blades including tips, wherein the plurality of rotor blades are rotatably mounted within a casing such that a blade tip clearance is defined between the rotor blade tips and the casing. The method also includes providing a system for use in inspecting the blade tip clearance by emitting electromagnetic energy toward the tips and detecting electromagnetic energy reflected by the tips. The method further includes positioning the system to facilitate inspection of the blade tip clearance, rotating the plurality of rotor blades within the casing, and simultaneously blending the tips using a blending apparatus and inspecting the blade tip clearance using the system.

14 Claims, 14 Drawing Sheets

METHOD AND SYSTEM FOR INSPECTING BLADE TIP CLEARANCE

CROSS-REFERENCE TO RELATED APPLICATIONS

This application is a continuation-in-part application of U.S. patent application Ser. No. 12/262,815 filed on Oct. 31, 2008 now U.S. Pat. No. 7,916,311, which is hereby incorporated by reference in its entirety.

BACKGROUND OF THE INVENTION

The field of this disclosure relates generally to the inspection of rotor blade tips and, more particularly, to a method and a system for use in inspecting blade tip clearance in a turbine engine.

At least some known turbine engines include a rotor assembly including a plurality of rows of rotor blades. Each rotor blade extends radially outward from a blade platform to a tip, and a flow path casing extends substantially circumferentially around the rotor assembly, such that a tip clearance is defined between each respective rotor blade tip and the casing. The tip clearance is designed to be a minimum, while being sized large enough to facilitate rub-free engine operation through a range of available engine operating conditions. During operation, engine performance may be influenced by the tip clearance between the rotor blade tips and the casing. Specifically, if the clearance increases, leakage across the rotor blade tips may adversely limit the performance of the engine.

Accordingly, it is often desirable to inspect the clearance between the casing and the rotor blade tips in a turbine engine to assess performance characteristics of the engine. In at least some known clearance inspection systems, the tip clearance of each rotor blade is measured manually. Such inspection techniques are time consuming and may be unreliable because of variability in measurements from operator to operator due to different measuring devices and/or different clearance inspection techniques.

Moreover, because of the increased time required to manually inspect the engine and because of the high degree of variability possible in clearance measurements performed by different operators, the quality of at least some known engine performance data may be insufficient to make fundamental engineering decisions that are required to optimize engine performance and energy output. In that regard, operating an engine at less than optimal performance may adversely impact operating revenues and may increase maintenance costs.

BRIEF DESCRIPTION OF THE INVENTION

In one aspect, a method for use in inspecting a blade tip clearance is provided. The method includes providing a plurality of rotor blades including tips, wherein the plurality of rotor blades are rotatably mounted within a casing such that a blade tip clearance is defined between the rotor blade tips and the casing. The method also includes providing a system for use in inspecting the blade tip clearance by emitting electromagnetic energy toward the tips and detecting electromagnetic energy reflected by the tips. The method further includes positioning the system to facilitate inspection of the blade tip clearance, rotating the plurality of rotor blades within the casing, and simultaneously blending the tips using a blending apparatus and inspecting the blade tip clearance using the system.

In another aspect, a system for use in inspecting the blade tips of rotor blades is provided. The system includes a probe holder assembly and a probe assembly including an electromagnetic probe. The electromagnetic probe is sized for insertion into the probe holder assembly and is configured to emit electromagnetic energy from the probe holder assembly for use in inspecting a tip clearance defined between the rotor blades and a casing extending outward from the rotor blades. The probe holder assembly is removably coupled to the casing to facilitate inspection of the blade tip clearance using the electromagnetic probe.

In another aspect, a method for use in assembling a blade tip clearance inspection system is provided. The method includes providing a probe holder assembly and providing a probe assembly including an electromagnetic probe, wherein the electromagnetic probe is sized to be inserted into the probe holder assembly and is configured to emit electromagnetic energy from the probe holder assembly during a blade tip clearance inspection. The method further includes removably coupling the probe holder assembly to a casing extending about the rotor blades to enable the electromagnetic probe to inspect the blade tip clearance.

DETAILED DESCRIPTION OF THE INVENTION

The following detailed description illustrates exemplary methods and systems for inspecting blade tip clearance by way of example and not by way of limitation. The description should clearly enable one of ordinary skill in the art to make and use the disclosure, and the description describes several embodiments, adaptations, variations, alternatives, and uses of the disclosure, including what is presently believed to be the best mode of carrying out the disclosure. The disclosure is described herein as being applied to a preferred embodiment, namely, methods and systems for inspecting compressor blade tip clearance in a gas turbine engine. However, it is contemplated that this disclosure has general application in a broad range of systems and/or a variety of other commercial, industrial, and/or consumer applications.

Figure 1:
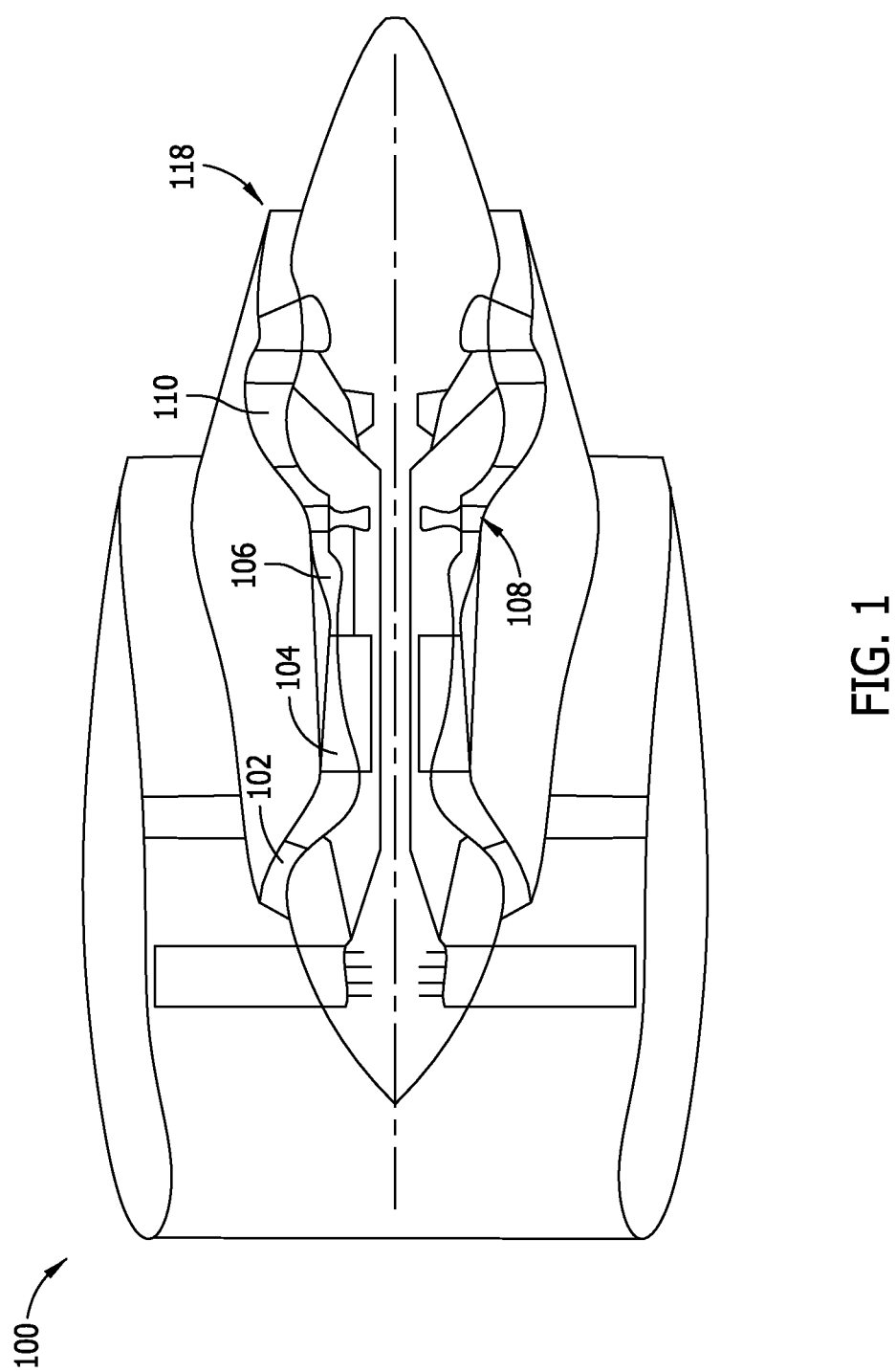
FIG. 1 is a schematic illustration of an exemplary gas turbine engine.

FIG. 1 is a schematic illustration of an exemplary gas turbine engine 100 including a fan assembly 102, a high pressure compressor 104, and a combustor 106. Engine 100 also includes a high pressure turbine 108 and a low pressure turbine 110. In operation, air flows through fan assembly 102 and compressed air is supplied from fan assembly 102 to high pressure compressor 104. The highly compressed air is delivered to combustor 106. Airflow from combustor 106 drives rotating turbines 108 and 110 and exits gas turbine engine 100 through an exhaust system 118.

Figure 2:
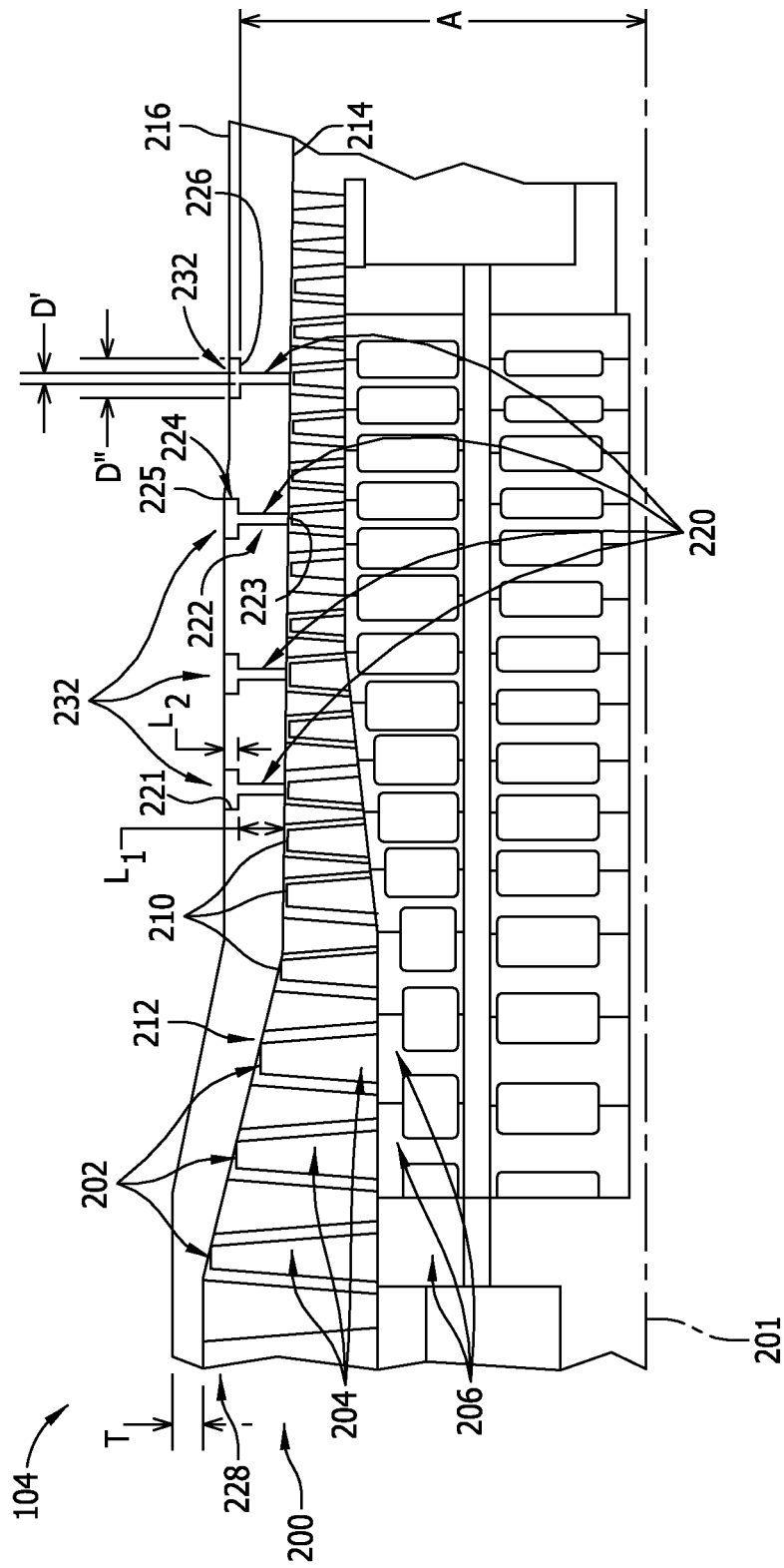
FIG. 2 is a cross-sectional view of an exemplary compressor for use in the gas turbine engine shown in FIG. 1.

FIG. 2 is a cross-sectional view of a portion of a compressor that may be used within engine 100 (shown in FIG. 1), such as, but not limited to, high pressure compressor 104. In the exemplary embodiment, compressor 104 includes a flow path 200 that extends through a plurality of compressor stages 202 that are oriented in an axial alignment along a centerline axis 201 extending through compressor 104. Each stage 202 includes a plurality of rotor blades 204 that are coupled to, and spaced circumferentially about, a rotor disk 206 using any suitable attachment configuration (e.g., a "dovetail" configuration). Each compressor rotor blade 204 has a tip 210.

A casing 212 circumscribes stages 202 and forms an outer periphery of flow path 200. Casing 212 includes an inner surface 214 and an outer surface 216. In an exemplary embodiment, casing 212 is fabricated from a plurality of casing segments (not shown) that are coupled together. In one embodiment, casing 212 is assembled by coupling together two casing segments to form a joint (not shown) on opposing sides thereof. In another embodiment, casing 212 is assembled from any number of casing segments. Alternatively, casing 212 may be formed unitarily, as a one-piece unit. In an exemplary embodiment, casing 212 circumscribes rotor blades 204 and is positioned in close proximity thereto, such that a blade tip clearance 218 (shown in FIG. 3) is defined between casing inner surface 214 and each blade tip 210.

In an exemplary embodiment, casing 212 includes at least one aperture 220 defined therein and extending therethrough. Each aperture 220 includes an inner surface 221, a first portion 222 (e.g., a bore) having a first end 223 defined in casing inner surface 214, and a second portion 224 (e.g., a counterbore) having a second end 225 defined in casing outer surface 216. First portion 222 is formed with a first length $L_1$ and a first diameter D', and second portion 224 is formed with a second length $L_2$ and a second diameter D" that is larger than first diameter D'. In one embodiment, first diameter D' is smaller than about 0.400 inches. Alternatively, first diameter D' may have any length that enables aperture 220 to function as described herein. In an exemplary embodiment, first portion 222 intersects second portion 224 at a first mating surface 226. In one embodiment, casing 212 has a thickness T that varies along centerline axis 201. Second length $L_2$ varies along centerline axis 201 with thickness T such that a predetermined distance A is maintained between first mating surface 226 and centerline axis 201. In an exemplary embodiment, first mating surface 226 is substantially planar. Alternatively, first mating surface 226 may have any suitable contour that enables casing 212 to function as described herein.

Each aperture 220 provides access to an interior cavity 228 defined within casing 212 and thus facilitates an inspection of blade tip clearance 218. In an exemplary embodiment, apertures 220 are spaced circumferentially about casing 212, and at least some apertures 220 are substantially aligned with each of a plurality of desired inspection stages 232 to enable a blade tip clearance 218 defined at each desired inspection stage 232 to be inspected. For example, in one embodiment, a plurality of apertures 220 are aligned with each of four desired inspection stages 232 (i.e., there are four sets of apertures 220). Alternatively, any number of sets of apertures 220 may be aligned with any number of desired inspection stages 232. In an exemplary embodiment, each set of apertures 220 includes four apertures 220 that are spaced circumferentially about casing 212. Alternatively, each set of apertures 220 may include any number of circumferentially-spaced apertures 220.

Figure 3:
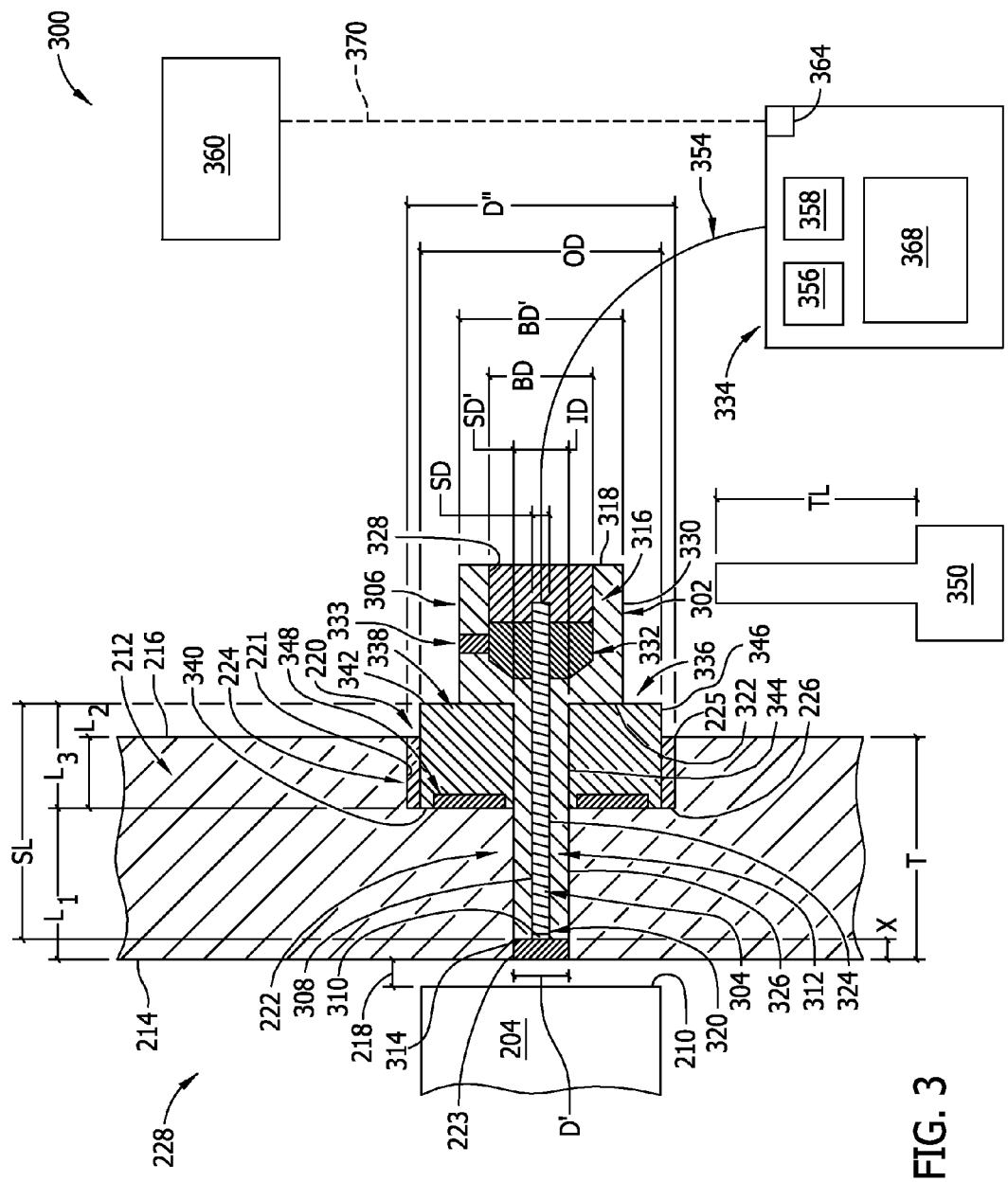
FIG. 3 is a partial cross-sectional view of an exemplary system that may be used to inspect a blade tip clearance in the compressor shown in FIG. 2.

FIG. 3 is cross-sectional view of an exemplary system 300 that may be used to inspect a blade tip clearance 218 defined in a rotor assembly, such as high pressure compressor 104 (shown in FIG. 2). In an exemplary embodiment, system 300 includes an inspection apparatus 302 including a probe 304 and a probe holder 306. Probe 304 includes an elongated body 308 that includes a tip 310 having a source for emitting electromagnetic energy and a detector (e.g., a sensor) for detecting reflected electromagnetic energy. Alternatively, body 308 may have any shape, and source and/or detector may be located anywhere relative to inspection apparatus 302 that enables inspection apparatus 302 to function as described herein. In one embodiment, probe 304 is an optical probe that emits and/or detects light (e.g., white light). In another embodiment, probe 304 may emit and/or detect any wavelength of electromagnetic energy. In one embodiment, probe 304 generates up to about 2,000 electromagnetic energy readings (i.e., emissions and/or detections) per second.

In the exemplary embodiment, probe holder 306 includes a generally cylindrical probe sheath 312 that has an end 314, a generally cylindrical base 316 having an end 318, and a cavity 320 that extends from sheath end 314 to base end 318. Alternatively, either base 316 and/or sheath 312 may have any shape and are not limited to cylindrical shapes. In an exemplary embodiment, sheath 312 and base 316 are integrally formed together to form a second mating surface 322 that is substantially planar. Alternatively, second mating surface 322 may be formed with any contour that enables system 300 to function as described herein. Sheath 312 has a length SL that extends from second mating surface 322 to sheath end 314. Sheath 312 also includes an inner surface 324 that is formed with an inner diameter SD, and an outer surface 326 that is formed with an outer diameter SD'. Base 316 includes an inner surface 328 that is formed with an inner diameter BD and an outer surface 330 that is formed with an outer diameter BD'. In an exemplary embodiment, sheath inner diameter SD is smaller than base inner diameter BD, and sheath outer diameter SD' is smaller than base outer diameter BD'. Alternatively, in another embodiment, sheath inner diameter SD may be larger than, or approximately the same size as, base inner diameter BD, and/or sheath outer diameter SD' may be larger than, or approximately the same size as, base outer diameter BD'. As used herein, the term "diameter" is defined as a distance across any cross-sectional shape (e.g., a rectangle, a triangle, etc.) and is not limited to only describing a distance across circular or elliptical cross-sectional shapes.

In an exemplary embodiment, probe 304 is housed within sheath 312 (i.e., probe 304 is positioned in cavity 320) such that probe tip 310 is adjacent to sheath end 314 and such that sheath inner surface 324 contacts probe 304 to facilitate stabilizing probe 304 within cavity 320. In one embodiment, probe holder 306 includes a probe socket 332 that provides power to probe 304, electrically couples probe 304 to a control unit 334, and/or enables a user to adjust a position of probe 304 within probe holder 306. In one embodiment, probe holder 306 includes a locking mechanism 333 that enables a user to securely couple and/or selectively release probe 304 from within probe socket 332 and/or probe holder 306.

To inspect blade tip clearance 218 using inspection apparatus 302, at least a portion of probe 304 and probe holder 306 are inserted into aperture 220. In the exemplary embodiment, aperture first portion 222 engages sheath 312 to facilitate stabilizing sheath 312 therein. More specifically, in the exemplary embodiment, sheath 312 is inserted into aperture first portion 222 such that sheath end 314 does not extend through aperture first end 223 to facilitate preventing inspection apparatus 302 from damaging rotor blades 204. Moreover, in another embodiment, sheath 312 is inserted into aperture first portion 222 such that a predetermined distance X is maintained between sheath end 314 and aperture first end 223. In an exemplary embodiment, distance X is approximately 0.100 inches. Alternatively, distance X may be any length that enables inspection apparatus 302 to function as described herein.

In the exemplary embodiment, system 300 includes a spacer 336 that is positioned between first mating surface 226 and second mating surface 322 to facilitate maintaining distance X. Spacer 336 has a body 338 that is defined by a first end 340 and a second end 342. A passage 344 extends through body 338 from first end 340 to second end 342. Body 338 has a length $L_3$, an inner diameter ID that is longer than sheath outer diameter SD' to enable sheath 312 to be inserted through passage 344, and an outer diameter OD that is shorter than aperture second diameter D" to enable spacer 336 to be inserted into aperture second portion 224. In one embodiment, spacer outer diameter OD is substantially the same length as aperture second diameter D" such that an outer surface 346 of spacer 336 slidably contacts inner surface 221 of aperture second portion 224 when spacer 336 is inserted within aperture 220. In the exemplary embodiment, spacer first end 340 and spacer second end 342 are substantially planar such that spacer first end 340 is positioned substantially flat against first mating surface 226 and such that spacer second end 342 is positioned substantially flat against second mating surface 322 when spacer 336 is inserted within aperture 220 between casing 212 and inspection apparatus 302. Spacer 336 may include at least one magnet 348 adjacent to spacer first end 340 and/or to spacer second end 342 to enable spacer 336 to be removably coupled to first mating surface 226 and/or to second mating surface 322. In an exemplary embodiment, spacer body length $L_3$ is longer than second length $L_2$ of aperture second portion 224 to facilitate maintaining distance X.

Alternatively, system 300 includes a plurality of different spacers 336, wherein at least one spacer 336 is positioned for each desired inspection stage 232 (shown in FIG. 2), such that distance X is facilitated to be maintained despite variations in casing thickness T at each desired inspection stage 232. For example, in an exemplary embodiment, system 300 includes three different spacers 336 that are each fabricated with a different length $L_3$ that facilitates their use at a particular desired inspection stage 232. In another alternative embodiment, system 300 does not include any spacers 336, and probe holder 306 is inserted into aperture 220 such that first mating surface 226 and second mating surface 322 are positioned substantially flat against one another.

In the exemplary embodiment, to facilitate reducing a possibility that inspection apparatus 302 will damage rotor blades 204 (shown in FIG. 2), system 300 includes a test probe 350 that is inserted into aperture 220 before inspection apparatus 302 is inserted into aperture 220. Test probe 350 is fabricated with a length TL that is approximately the same as sheath length SL. In an exemplary embodiment, to facilitate preventing damage to rotor blades 204, test probe 350 is fabricated from a material that has a shearing strength of about 3,380 pounds per square inch (psi) (e.g., a high density polyethylene or a nylon material). Such a shearing strength ensures that test probe 350 will shear upon impact with rotor blades 204. In another embodiment, test probe 350 is fabricated from a material that has a shearing strength of less than about 4,000 psi.

System 300 also includes a probe control unit 334 that is communicatively coupled to probe 304 (e.g., via electric wiring 354, a wireless system, and/or any other suitable communication medium). Control unit 334 includes a control unit memory 356 and a control unit controller 358 that communicates with probe 304, communicates with a computer system 360, and/or enables data to be stored in control unit memory 356. As used herein, the term controller may include any processor-based or microprocessor-based system that includes microcontrollers, reduced instruction set circuits (RISC), application-specific integrated circuits (ASICs), logic circuits, and any other circuit or processor that is capable of executing the functions described herein. The examples provided above are exemplary only, and are not intended to limit in any way the definition and/or meaning of the term controller. Control unit 334 includes at least one communication device (e.g., a universal serial bus (USB) port 364, a wireless receiving/transmitting device, etc.) to communicate with computer system 360.

In one embodiment, control unit 334 is a handheld unit. Alternatively, control unit 334 may have any suitable size, shape, and/or mechanical configuration (e.g., wheels) that enables control unit 334 to be transported by a user from one inspection location to another inspection location. As used herein, the term "inspection location" refers to a location of each aperture 220 at each desired inspection stage 232. Control unit 334 may be powered using any suitable power source, across any suitable medium, such as battery power or hardwiring, for example. In the exemplary embodiment, control unit 334 includes at least one display 368 for displaying a user interface. Display 368 may utilize various display technologies, including, but not limited to, liquid crystal display (LCD), plasma, cathode ray tube (CRT), or analog-type display technologies. Display 368 displays information and/or at least one data entry field associated with a blade tip clearance 218 inspection operation (e.g., a stage number data entry field, a casing thickness data entry field, and/or an aperture number data entry field). In an exemplary embodiment, control unit 334 is programmed to transmit and/or receive signals from the source and/or the detector that are indicative of emitted and/or detected electromagnetic energy. In an exemplary embodiment, control unit controller 358 is programmed to process the signals received from probe 304, generate at least one blade tip clearance reading, and/or store, in control unit memory 356, at least one record for each reading that occurs during a given operational period.

In the exemplary embodiment, computer system 360, or any component thereof, is located remotely from control unit. System 360 may include a computer, an input device, a display unit, and an interface, for example, to access the Internet. Computer system 360 may also include a processor, which may be coupled to a communication bus. The computer may include a memory, which may include a Random Access Memory (RAM) and a Read Only Memory (ROM), as well as a storage device, which may be a hard disk drive or a removable storage drive such as a floppy disk drive, an optical disk drive, and so forth. The storage device is configured to load computer programs and/or other instructions into the computer system. As used herein, the term "processor" is not limited to only integrated circuits referred to in the art as a processor, but broadly refers to a computer, a microcontroller, a microcomputer, microprocessor, a programmable logic controller, an application specific integrated circuit and any other programmable circuit.

Computer system 360 executes instructions, stored in one or more storage elements, to process input data. The storage elements may also hold data or other information, as desired or required, and may be in the form of an information source or a physical memory element in the processing machine. The set of instructions may include various commands that instruct the computer system to perform specific operations, such as the processes of a method. The set of instructions may be in the form of a software program. The software may be in various forms, such as system software or application software. Further, the software may be in the form of a collection of separate programs, a program module within a larger program, or a portion of a program module. The software may also include modular programming in the form of object-oriented programming The processing of input data by the processing machine may be in response to user commands, to results of previous processing, or to a request made by another processing machine.

As used herein, the term 'software' includes any computer program that is stored in the memory, to be executed by a computer, which includes RAM memory, ROM memory, EPROM memory, EEPROM memory, and non-volatile RAM (NVRAM) memory. The memory types mentioned above are only exemplary and do not limit the types of memory used to store computer programs.

In an exemplary embodiment, control unit 334 communicates with computer system 360 (i.e., via any suitable communication device and/or communication medium 370, such as, for example, a copper cable, a fiber optic cable, a radio frequency or other method of wireless communication, and/or any combination thereof). In one embodiment, computer system 360 is programmed to receive at least one record from control unit 334, store the records in the computer system memory, process the records, and/or output blade tip clearance data to a user (i.e. statistical data via a spreadsheet) using the records. In another embodiment, computer system 360 outputs at least the following data: (1) inspection location stage number; (2) inspection location aperture number; (3) inspection location casing thickness; (4) probe electromagnetic emission/detection frequency; (5) number of electromagnetic records (i.e., emissions/detections) collected for each rotor blade at each inspection location; (6) average blade tip clearance for each rotor blade at each inspection location; and/or (7) average blade tip clearance for all rotor blades at each desired inspection stage. In an alternative embodiment, system 300 does not include computer system 360, and control unit 334 is configured to perform the operations of computer system 360, as described herein.

In an exemplary embodiment, system 300 includes an electric rotating device (not shown) (e.g., an electric turn gear) for rotating rotor blades 204 during an inspection operation. In one embodiment, the rotating device rotates rotor blades 204 at approximately seven revolutions per minute (rpm) during an inspection operation. In another embodiment, the rotating device may rotate rotor blades 204 at any rotational speed. During rotation of rotor blades 204, a user inserts inspection apparatus 302 into casing 212 at each inspection location. Prior to inserting inspection apparatus 302 in a desired aperture 220, the user inputs inspection location data into control unit user interface 368 (e.g., inspection location stage number, inspection location aperture number, inspection location casing thickness, etc.). After entering inspection location data, the user inserts spacer 336 into aperture second portion 224 and inserts test probe 350 through spacer 336 and into aperture first portion 222 to determine if the proper spacer 336 has been selected. If test probe 350 contacts rotor blades 204, the user inserts a different spacer 336 that has a different length $L_3$ into aperture second portion 224 and reinserts test probe 350 through spacer 336 and into aperture first portion 222 to determine whether test probe 350 contacts rotor blades 204. Once the user identifies the proper spacer 336 that prevents test probe 350 from contacting rotor blades 204, the user removes test probe 350 from spacer 336 and inserts inspection apparatus 302 (i.e., probe 304 and sheath 312) through spacer 336 and into aperture first portion 222.

After inserting inspection apparatus 302 through spacer 336 and into aperture first portion 222, the user instructs control unit 334 to begin a blade tip clearance inspection operation of blade tip clearance 218 (i.e., by interacting with user interface 368). Control unit 334 and probe 304 transmit and/or receive signals that are indicative of electromagnetic energy emitted and/or received by probe 304. Control unit 334 stores a plurality of blade tip clearance records for each blade 204 at a particular inspection location (e.g., control unit 334 may store about fifteen records per blade 204 for each inspection location). After inspecting blade tip clearance 218 at each inspection location, control unit 334 transmits each record stored during the inspection operation to computer system 360, and computer system 360 stores the records and outputs blade tip clearance data to the user.

Figure 4:
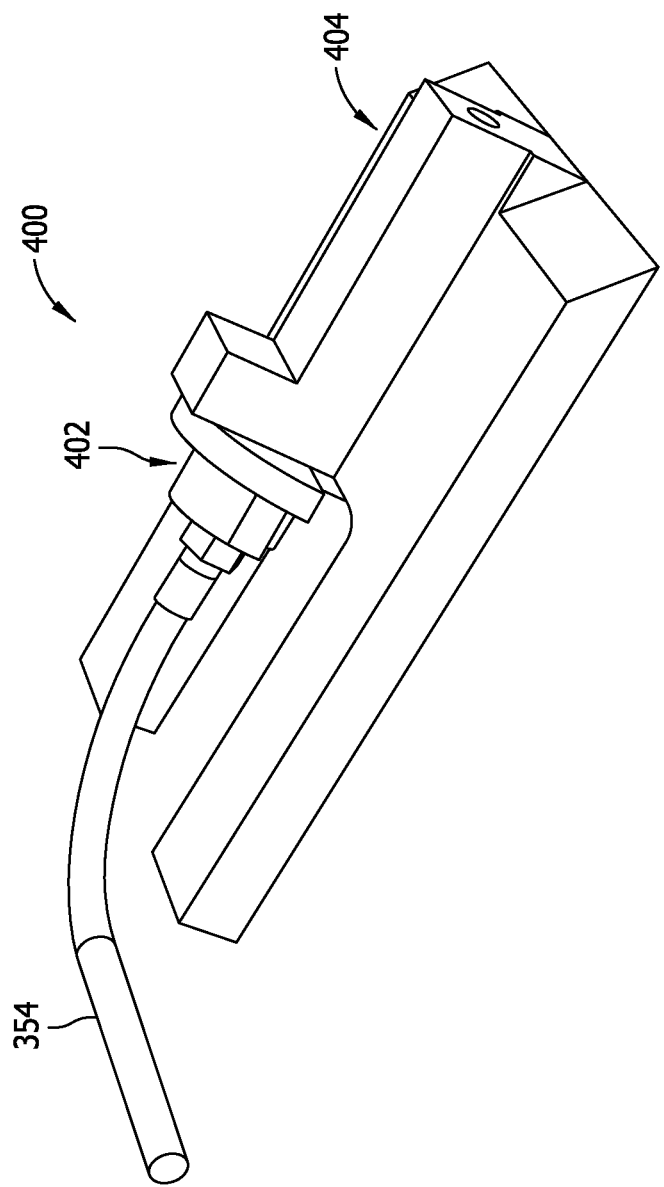
FIG. 4 is a perspective view of an alternative system that may be used to inspect a blade tip clearance in the compressor shown in FIG. 2.
Figure 5:
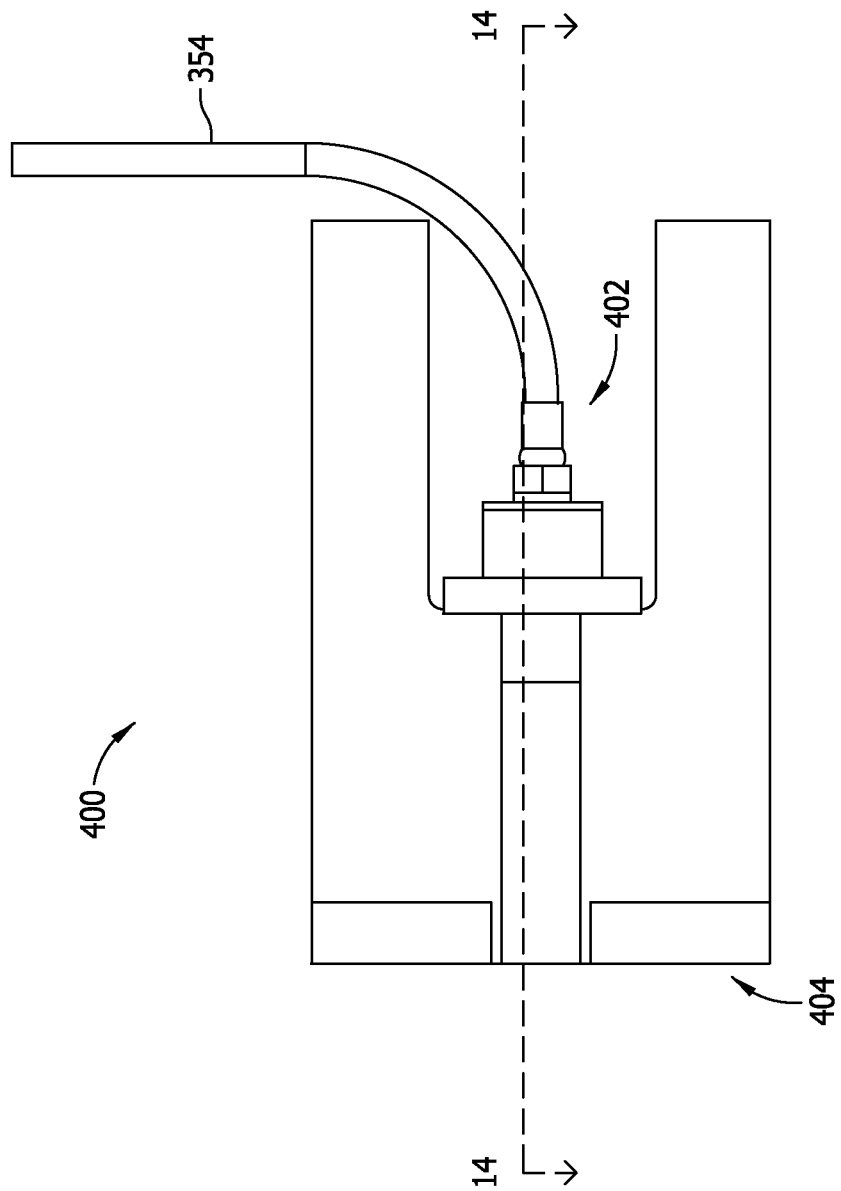
FIG. 5 is a top view of the system shown in FIG. 4.

FIG. 4 is a perspective view of an alternative embodiment of a system 400 that may be used for inspecting blade tip clearance 218. FIG. 5 is a top view of system 400. In the exemplary embodiment, system 400 is configured for inspecting blade tip clearance 218 (e.g., a change in blade tip clearance 218) during blending of blade tips 210, as described in more detail below. In the exemplary embodiment, system 400 includes a probe assembly 402 and a probe holder assembly 404 that enables probe assembly 402 to be removably coupled thereto.

Figure 6:
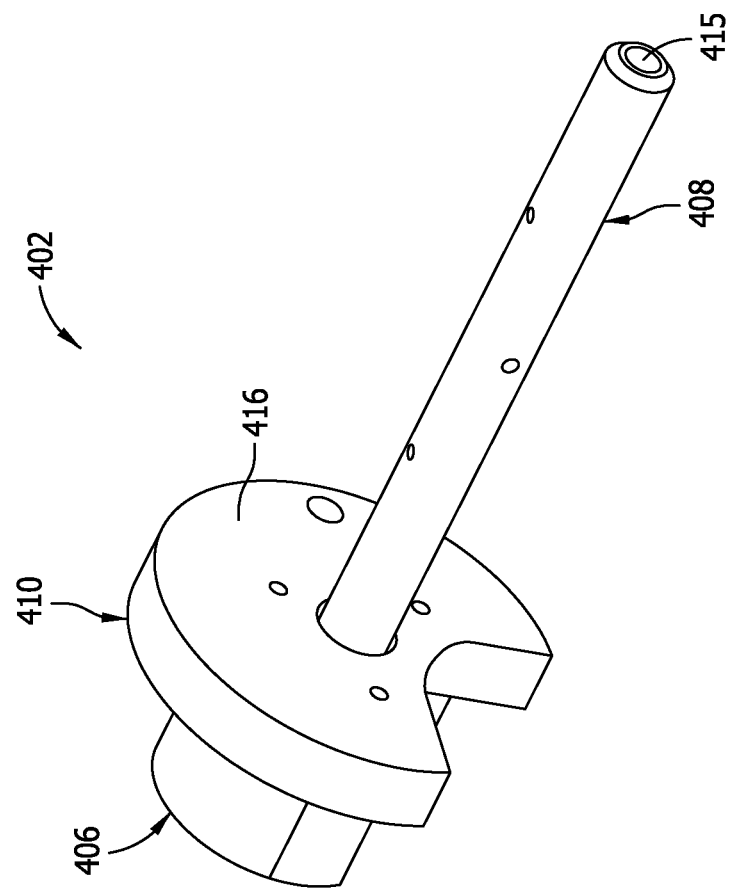
FIG. 6 is a perspective view of an exemplary probe assembly that may be used with the system shown in FIG. 4.
Figure 7:
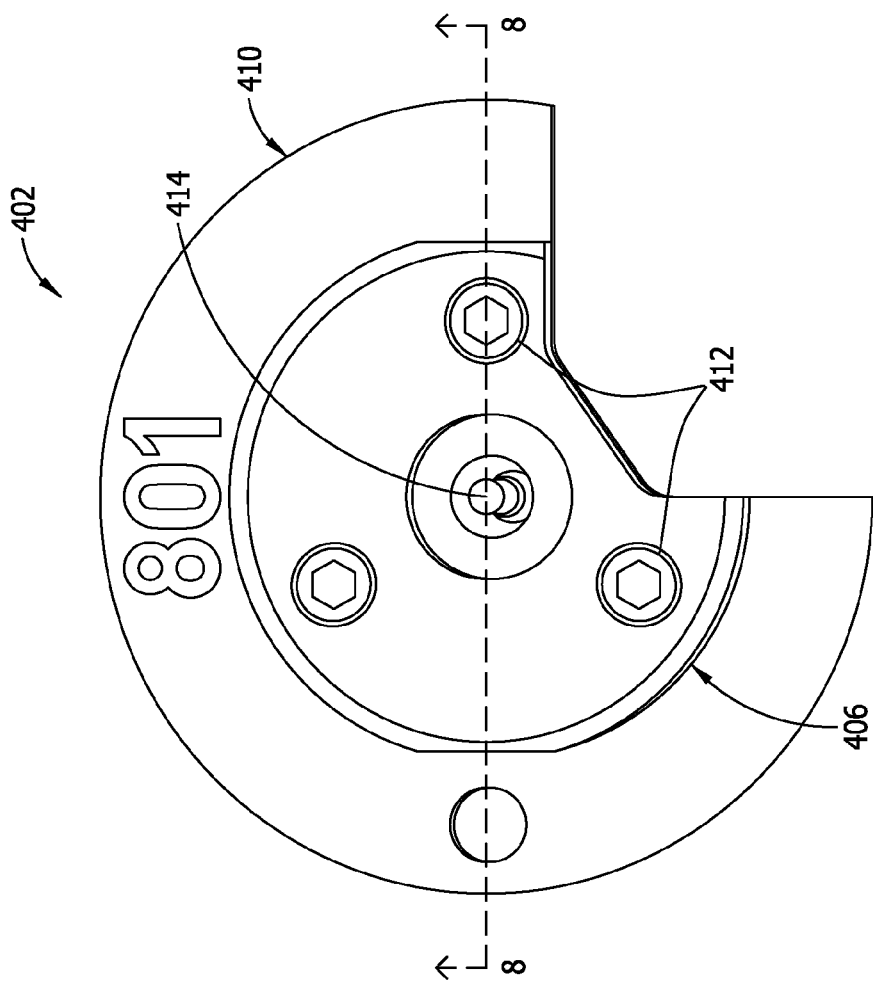
FIG. 7 is a rear view of the probe assembly shown in FIG. 6.
Figure 8:
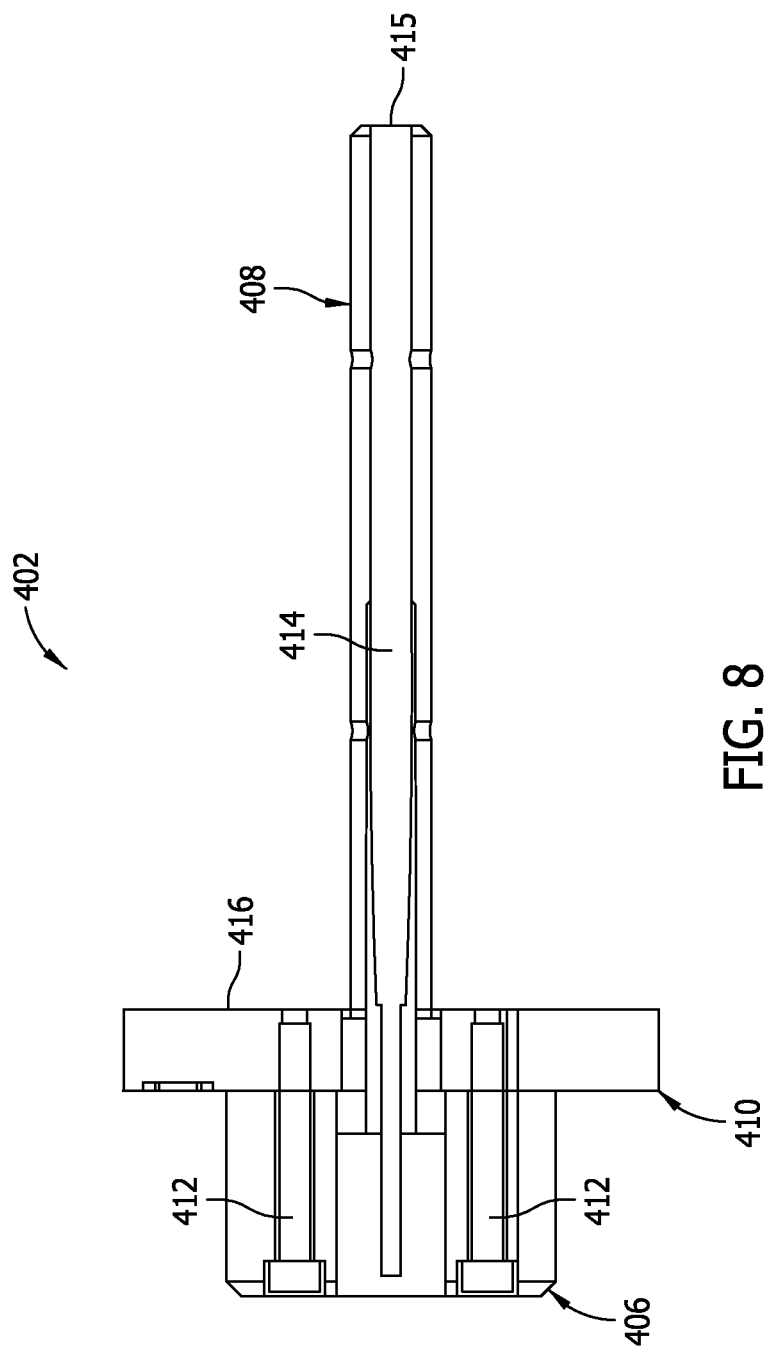
FIG. 8 is a cross-sectional view of the probe assembly shown in FIG. 7 taken along line 8-8.

FIGS. 6 and 7 are respective perspective and back views of probe assembly 402. FIG. 8 is a cross-sectional view of probe assembly 402 taken along line 8-8. In the exemplary embodiment, probe assembly 402 includes a socket 406, a sheath 408 integrally formed with and extending from socket 406, a plate 410 coupled to socket 406 and extending about sheath 408 (e.g., using a plurality of fasteners 412), and a probe 414 inserted at least partially into sheath 408. Socket 406 enables power to be supplied to probe 414 and/or enables electrically coupling probe 414 to control unit 334. Sheath 408 facilitates protecting probe 414 from being contacted and damaged during use, and also facilitates stabilizing probe 414 in its extension from socket 406. In the exemplary embodiment, probe 414 has an elongated shape and a tip 415 that is configured to emit electromagnetic energy and/or detect reflected electromagnetic energy. In one embodiment, probe 414 is an optical probe that emits and/or detects visible light (e.g., white light). In another embodiment, probe 414 may emit and/or detect any wavelength of electromagnetic energy. Alternatively, socket 406 and plate 410 may be integrally formed together as a unitary member, and/or socket 406 and sheath 408 may be formed separately from, and coupled to, one another in any suitable manner.

In the exemplary embodiment, plate 410 is disc-shaped and includes a front face 416 that abuts against probe holder assembly 404. Moreover, at least a portion of plate 410 (e.g., front face 416) is fabricated from a metallic material to enable probe assembly 402 to be magnetically coupled to probe holder assembly 404 in a detachable manner, as described in more detail below. Alternatively, plate 410 may have any suitable configuration and may be fabricated from any suitable material that enables probe assembly 402 to function as described herein (e.g., plate 410 may have any suitable shape and may be fabricated from a non-metallic material).

Figure 9:
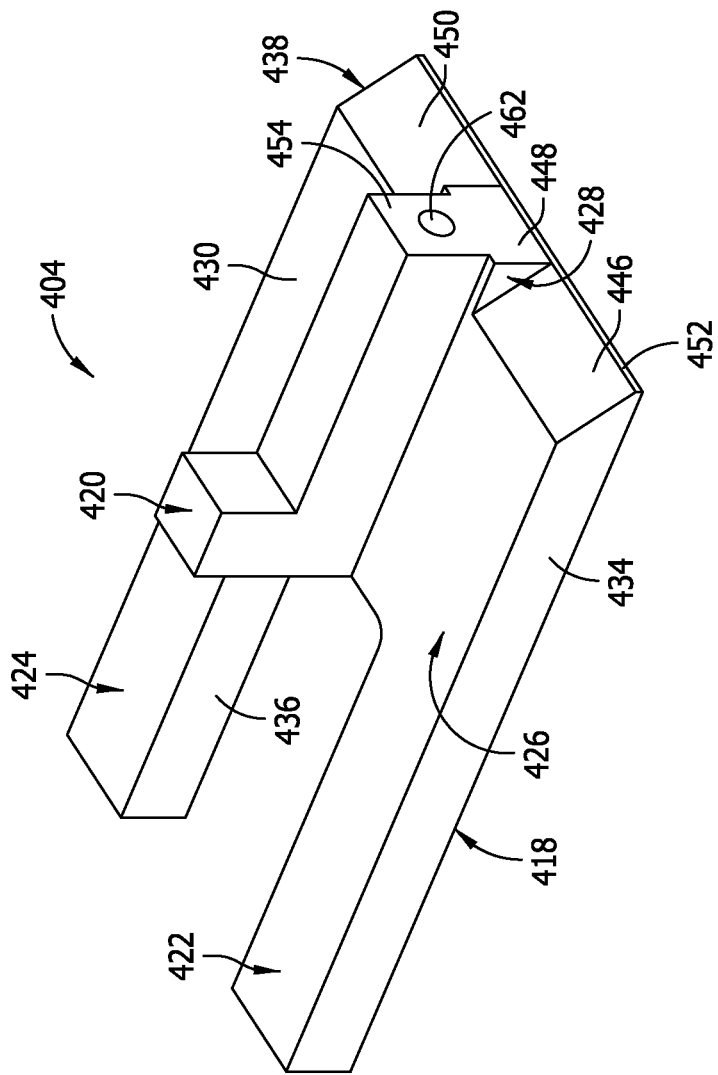
FIG. 9 is a perspective view of an exemplary probe holder assembly that may be used with the system shown in FIG. 4.
Figure 10:
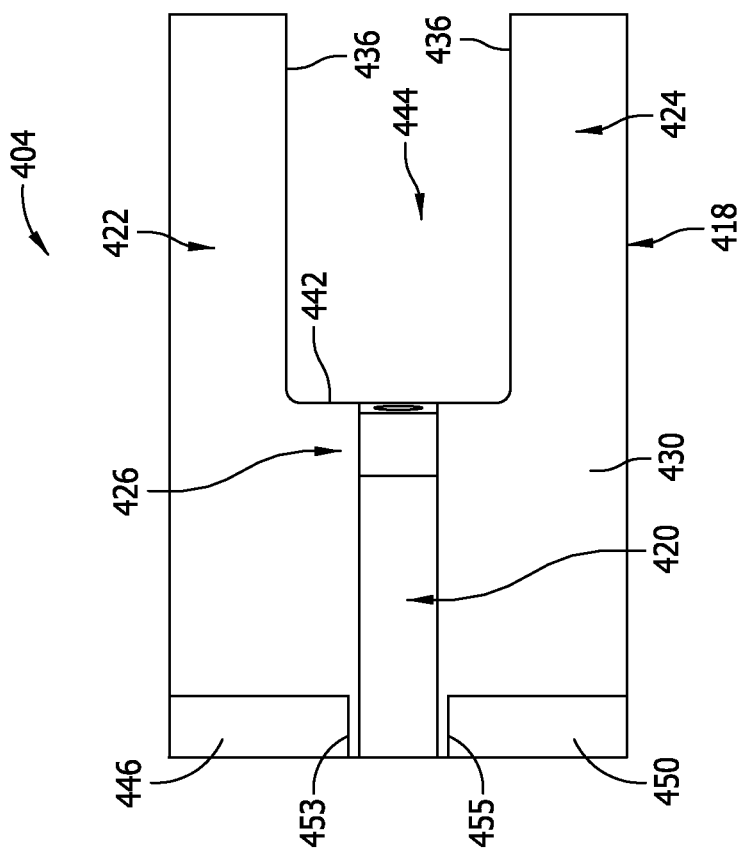
FIG. 10 is a top view of the probe holder assembly shown in FIG. 9.
Figure 11:
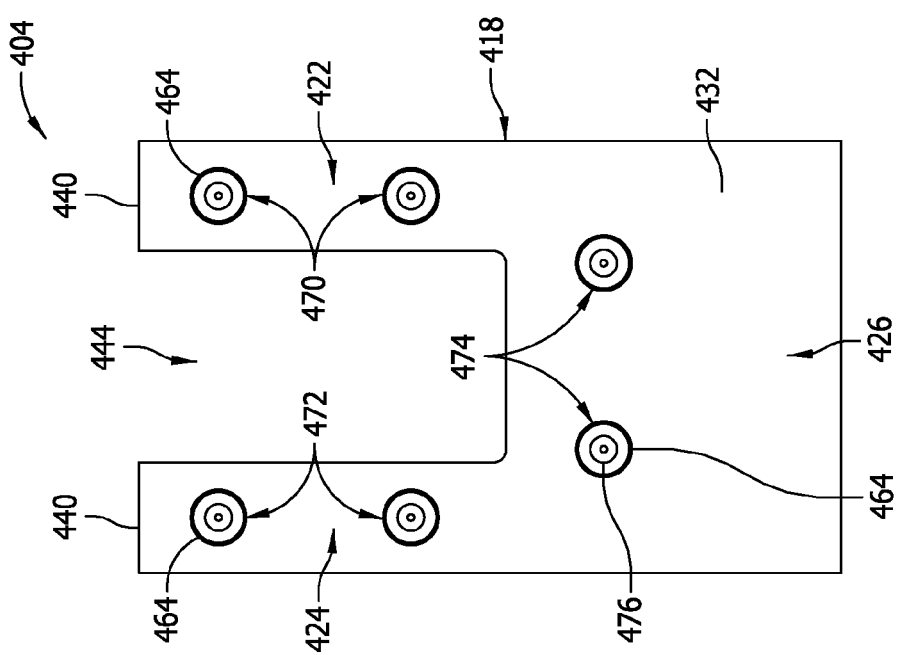
FIG. 11 is a bottom view of the probe holder assembly shown in FIG. 9.
Figure 12:
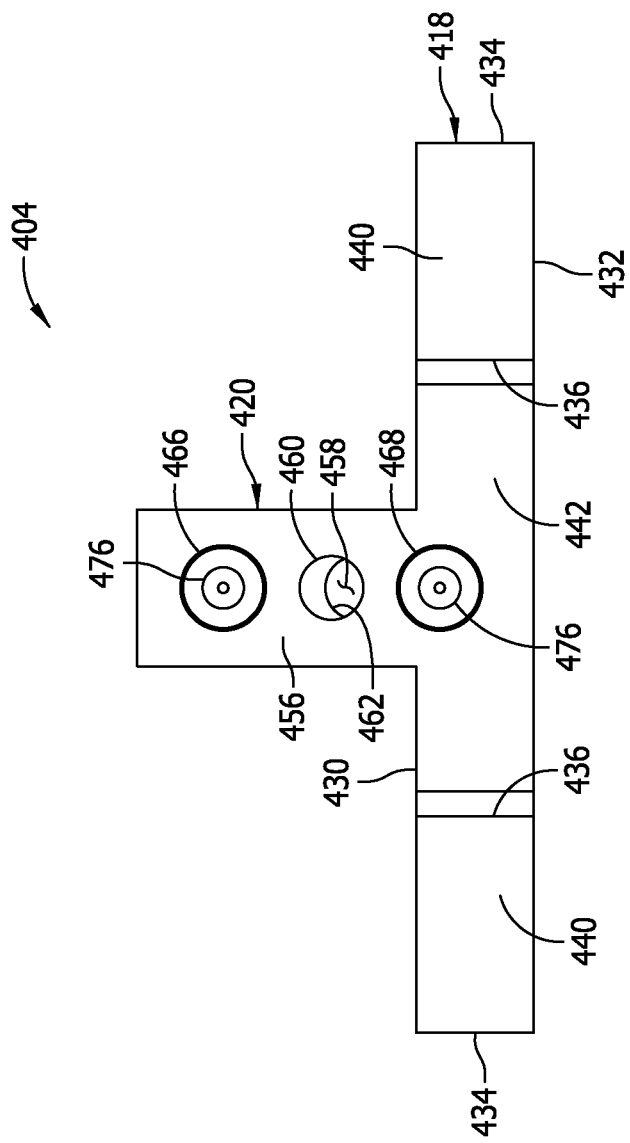
FIG. 12 is a rear view of the probe holder assembly shown in FIG. 9.
Figure 13:
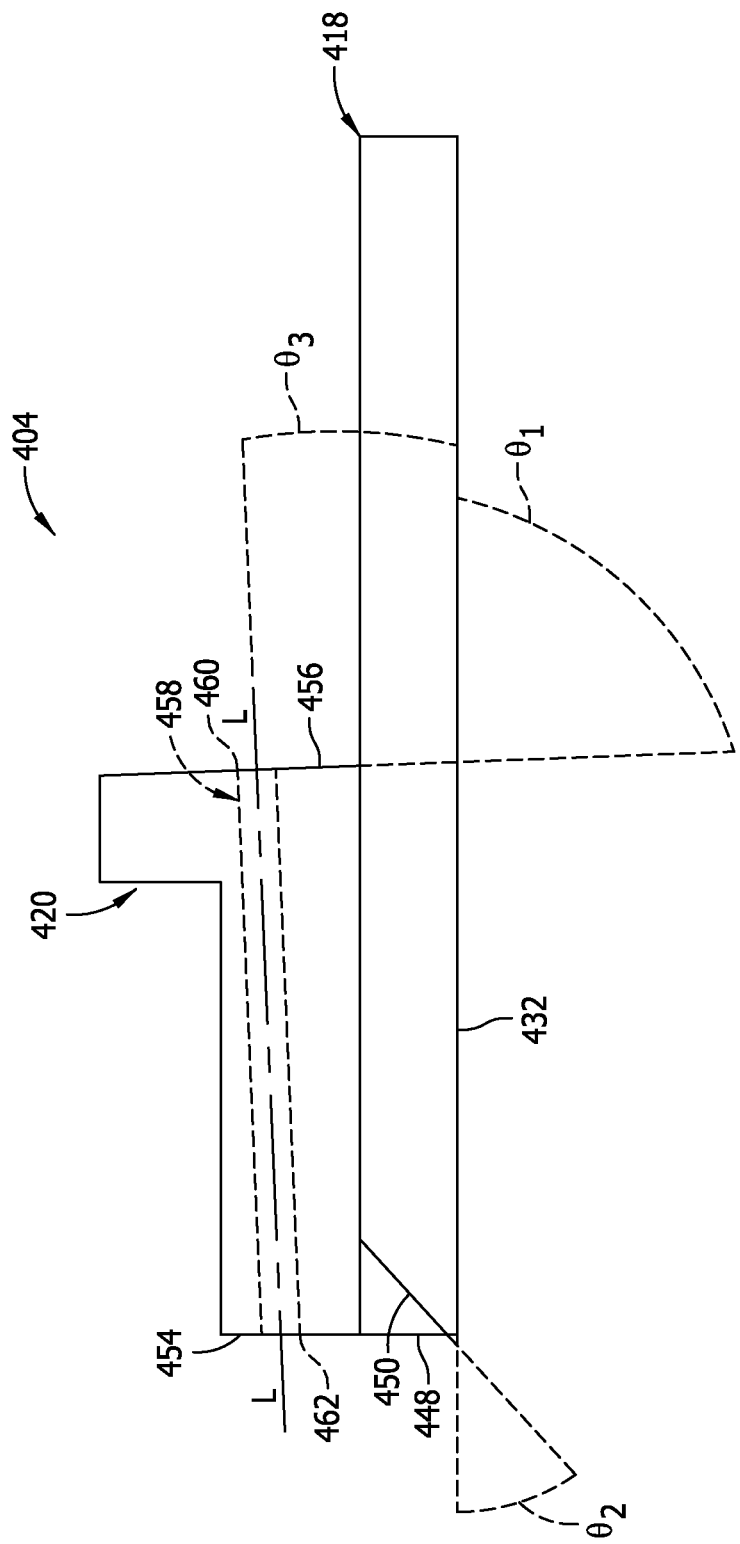
FIG. 13 is a side view of the probe holder assembly shown in FIG. 9.

FIG. 9 is a perspective view of probe holder assembly 404. FIGS. 10, 11, 12, and 13 are respective top, bottom, rear, and side views of probe holder assembly 404. In the exemplary embodiment, probe holder assembly 404 includes a support 418 and a cover 420 that are integrally formed together as a unitary member. In other embodiments, support 418 and cover 420 may be formed separately, and coupled together using any suitable coupling mechanism.

In the exemplary embodiment, support 418 has a generally U-shaped planform and includes a first leg 422, a second leg 424, and a base 426 extending between first leg 422 and second leg 424. Moreover, a support ledge 428 extends from base 426 opposite legs 422 and 424. Support 418 also includes a top surface 430, a bottom surface 432, a pair of outer side surfaces 434, a pair of inner side surfaces 436, a plurality of front surfaces 438, a pair of distal back surfaces 440, and a proximal back surface 442. Inner side surfaces 436 and proximal back surface 442 collectively define the concavity 444 of the U-shaped planform. In the exemplary embodiment, top surface 430 and bottom surface 432 are substantially parallel to one another, and distal back surfaces 440 and outer side surfaces 434 are substantially perpendicular to top surface 430 and to bottom surface 432. In other embodiments, top surface 430, bottom surface 432, distal back surfaces 440, and outer side surfaces 434 may have any orientations relative to one another that enable support 418 to function as described herein. In the exemplary embodiment, proximal back surface 442 is substantially planar and is oriented obliquely relative to surfaces 430 and 432 such that back surface 442 forms an acute angle $\theta_1$ (e.g., between about 85° and about) 89° with bottom surface 432. In other embodiments, back surface 442 may have any suitable orientation that enables support 418 to function as described herein.

In the exemplary embodiment, front surfaces 438 include a first segment 446, a second segment 448, and a third segment 450 that collectively define a front edge 452 of support 418. First and third segments 446 and 450 are spaced a distance apart on opposite sides 453 and 455 of support ledge 428, and second segment 448 is formed on support ledge 428 and between segments 446 and 450. In the exemplary embodiment, first and third segments 446 and 450, respectively, are substantially planar and are each oriented obliquely relative to surfaces 430 and 432 such that segments 446 and 450 form acute angles $\theta_2$ (e.g., about) 45° with bottom surface 432. Second segment 448 is substantially perpendicular to surfaces 430 and 432. In other embodiments, first, second, and third segments 446, 448, and 450, respectively, may be arranged in any orientation relative to surfaces 430 and 432 that enables support 418 to function as described herein. Alternatively, support 418 may have any suitable configuration that enables support 418 to function as described herein (e.g., support 418 may not be generally U-shaped, may not have support ledge 428, and/or may have a front surface that is not segmented).

In the exemplary embodiment, cover 420 is generally L-shaped and includes a substantially planar front surface 454 and a substantially planar back surface 456. Cover 420 extends along base 426 and support ledge 428 such that back surface 456 is substantially co-planar with proximal back surface 442 and such that front surface 454 is substantially co-planar with second segment 448. Thus, back surface 456 is oriented at approximately the same angle (i.e., angle $\theta_1$) as proximal back surface 442, and front surface 454 is oriented at approximately the same angle (i.e., 90°) as second segment 448. In other embodiments, surfaces 454 and 456 may be oriented in any orientation that enables cover 420 to function as described herein. In the exemplary embodiment, cover 420 defines a passage 458 therein that is sized to receive sheath 408. Specifically, passage 458 extends from a first end 460, located on back surface 456, to a second end 462, located on front surface 454. Moreover, passage 458 has a longitudinal axis L that is oriented substantially perpendicular to back surface 456 such that longitudinal axis L is oriented at an angle $\theta_3$ relative to bottom surface 432. Angle $\theta_3$ is complementary to angle $\theta_1$. Alternatively, passage 458 may have any orientation that enables cover 420 to function as described herein.

In the exemplary embodiment, probe holder assembly 404 also includes a plurality of first magnetic portions 464 arranged on bottom surface 432, a second magnetic portion 466 arranged on back surface 456 above first end 460 of passage 458, and a third magnetic portion 468 arranged partially on proximal back surface 442 and partially on back surface 456, below first end 460 of passage 458. A first pair 470 of first magnetic portions 464 is located on first leg 422, a second pair 472 of first magnetic portions 464 is located on second leg 424, and a third pair 474 of first magnetic portions 464 is located on base 426 such that first magnetic portions 464 have a generally U-shaped arrangement on bottom surface 432. In other embodiments, support 418 may have any suitable number of magnetic portions 464, 466, and/or 468 arranged in any suitable manner that enables support 418 to function as described herein. In the exemplary embodiment, magnetic portions 464, 466, and 468 are formed separately from, and coupled to, support 418 and cover 420 via suitable fasteners 476. In some embodiments, magnetic portions 464, 466, and/or 468 may be formed integrally with support 418 and/or cover 420.

In the exemplary embodiment, within system 400, probe control unit 334 is communicatively coupled to probe (e.g., via electric wiring 354, a wireless system, and/or any other suitable communication medium, as described above). Control unit 334 may include control unit memory 356 and control unit controller 358 that communicates with probe 414, communicates with computer system 360, and/or that enables data to be stored in control unit memory 356. Control unit 334 may be configured to facilitate inspecting blade tip clearance 218 in any suitable manner, and the configuration of control unit 334 is not limited to the inspection techniques described above for use with system 300.

Figure 14:
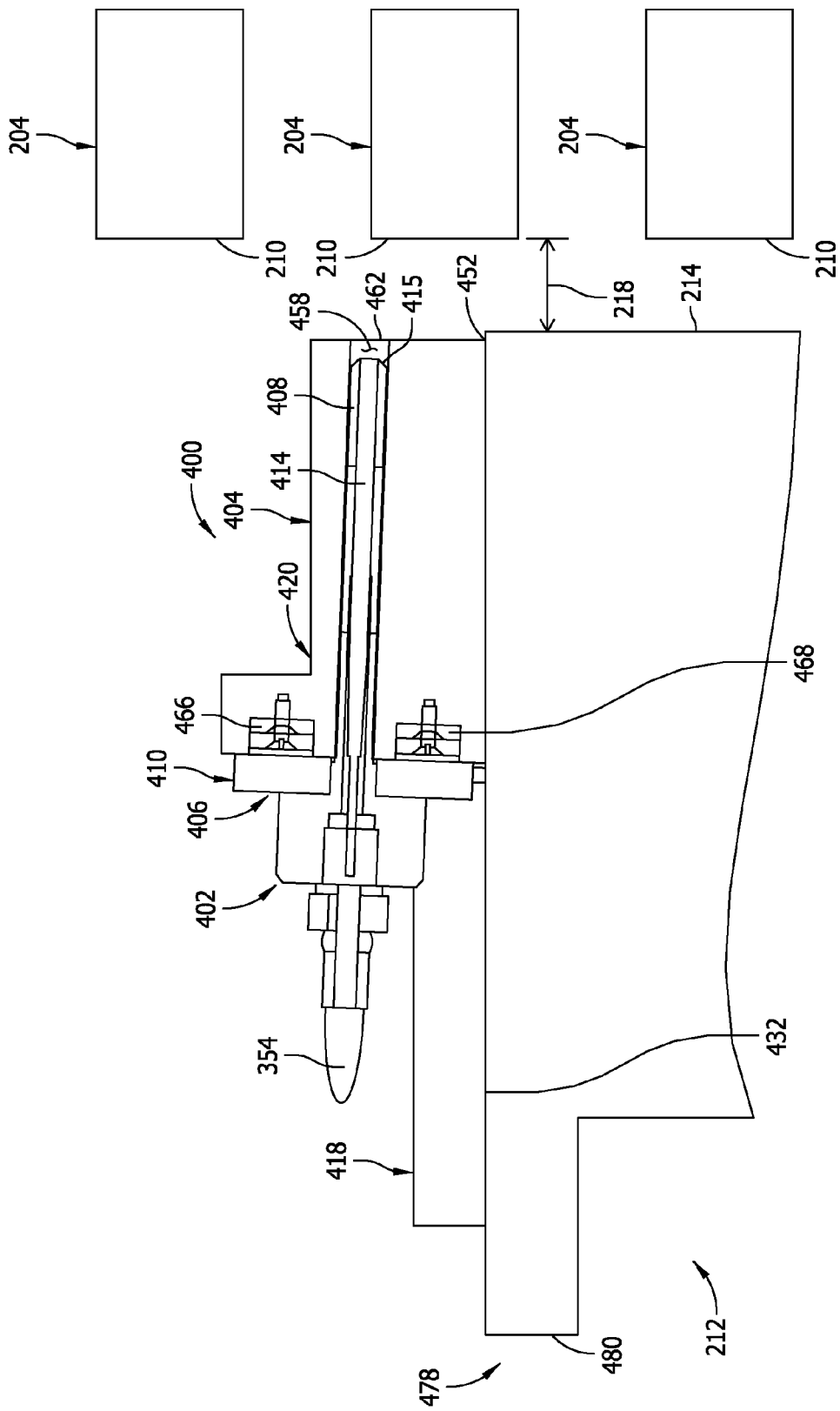
FIG. 14 is a cross-sectional view of the system shown in FIG. 5 taken along line 14-14 and coupled to a casing of the compressor shown in FIG. 2.

FIG. 14 is a cross-sectional view of system 400 taken along line 14-14 (FIG. 5) and coupled to casing 212. When assembled in system 400, probe 414 and wiring 354 are coupled to socket 406 such that wiring 354 transfers electromagnetic energy to probe 414 for use in inspecting tip clearance 218. Probe 414 and sheath 408 are inserted into passage 458 of cover 420 such that tip 415 is spaced a distance from second end 462 of passage 458. Plate 410, which is at least partially fabricated from a metallic material, is magnetically coupled to cover 420 and support 418 via second magnetic portion 466 and third magnetic portion 468, respectively, such that probe assembly 402 is detachably coupled to probe holder assembly 404.

To operate the exemplary embodiment of system 400, a first segment (e.g., a top half (not shown)) of casing 212 is detached from a second segment (e.g., a bottom half 478) of casing 212 such that rotor blades 204 are accessible. With the top half of casing 212 removed in the exemplary embodiment, inner surface 214 of bottom half 478 is at least partially exposed. System 400 is then coupled to bottom half 478 such that bottom surface 432 of support 418 is seated on bottom half 478 with front edge 452 of support 418 aligned with (e.g., slightly offset from) inner surface 214 and with tip 415 of probe 414 oriented toward rotor blades 204. First magnetic portions 464 on bottom surface 432 of support 418 facilitate detachably coupling support 418 to casing 212, and legs 422 and 424 facilitate clamping probe holder assembly 404 to bottom half 478 (e.g., legs 422 and 424 may be clamped to a flange 480 that is used to fasten the top half of casing 212 to casing bottom half 478). Because first and third segments 446 and 450 of support 418 are oriented at angle $\theta_2$, it is easier to align front edge 452 with inner surface 214. Because back surface 456 and proximal back surface 442 are oriented at angle $\theta_1$, and because longitudinal axis L of passage 458 is oriented at complementary angle $\theta_3$, it is easier to maintain probe assembly 402 coupled to cover 420, and it is easier to achieve an optimal orientation of probe 414 relative to rotor blades 204, thereby facilitating more accurate inspection of tip clearance 218. Also, because front surface 454 is oriented at approximately the same angle as second segment 448, probe 414 can be extended closer to front edge 452 and, therefore, closer to rotor blades 204, while being sufficiently spaced apart therefrom to protect probe 414 from being damaged.

During operation, when system 400 is coupled to casing bottom half 478, a user may operate an electric rotating device (e.g., an electric turn gear) to rotate rotor blades 204. While rotor blades 204 are being rotated and while system 400 is inspecting blade tip clearance 218, a blending apparatus (e.g., a belt grinder) may be used to blend blade tips 210. For example, when a stage 202 of rotor blades 204 is rotated by the electric turn gear, a belt grinder may simultaneously grind blade tips 210 while the user is operating system 400 to inspect changes in blade tip clearances 218 of the entire stage 202 during the grinding operation (e.g., the user is evaluating output data from control unit 334 to make real-time determinations as to when blade tip clearances 218 are acceptable across the entire stage 202 and, therefore, grinding of the stage 202 ceases). When operating system 400, the user may also interact with control unit 334 to instruct system 400 to process and store any detected change in tip clearance 218 as material is being removed from blade tips 210 via the blending apparatus. In other embodiments, system 400 may be operated in any suitable manner to inspect blade tip clearance using any suitable techniques. As described herein, system 400 therefore facilitates measuring blade tip clearance 218 using less time consuming and more reliable tip clearance inspection techniques.

The methods and systems described herein facilitate inspection of gas turbine engine compressor rotor blade tip clearance. More specifically, the methods and systems described herein facilitate minimizing variability in blade tip clearance measurements by providing automated and repeatable inspection techniques, such that an engine performance data quality increases to enable fundamental engineering decisions to be made regarding optimizing engine performance and energy output. Additionally, the methods and systems described herein facilitate inspection of blade tip clearance while the engine casing is completely assembled and/or while the engine casing is disassembled. Also, the methods and systems described herein facilitate inspection of blade tip clearances as the blade tips are being blended, thereby enabling real-time determinations to be made as to when blade tip clearances are within tolerances. Moreover, the methods and systems described herein facilitate reducing engine inspection cycle time, thereby decreasing inspection costs.

As will be appreciated by one skilled in the art and supported on the foregoing specification, the above-described embodiments of the invention may be implemented using computer programming or engineering techniques including computer software, firmware, hardware, or any combination or subset thereof, wherein one technical effect is to facilitate inspecting blade tip clearance. Any resulting program, having computer-readable code means, may be embodied or provided within one or more computer-readable media, thereby making a computer program product (i.e., an article of manufacture, according to the discussed embodiments of the invention). The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, and/or by transmitting the code over a network.

Exemplary embodiments of methods and systems for inspecting blade tip clearance are described above in detail. The methods and systems for inspecting blade tip clearance are not limited to the specific embodiments described herein, but rather, components of the methods and systems may be utilized independently and separately from other components described herein. For example, the methods and systems described herein may have other industrial and/or consumer applications and are not limited to practice with only gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A system for use in inspecting the blade tips of rotor blades within a turbine casing after a top portion of the turbine casing is removed, said system comprising:
   a probe holder assembly comprising a substantially planar bottom surface and a passage having a longitudinal axis oriented obliquely relative to said bottom surface, said bottom surface configured to couple to the turbine casing such that said bottom surface is substantially coplanar with an upper surface of the turbine casing; and
   a probe assembly comprising an electromagnetic probe, said electromagnetic probe is sized for insertion into said probe holder assembly passage and is configured to emit electromagnetic energy from said passage for use in inspecting a tip clearance defined between the rotor blades and an inner surface of the casing.

2. A system in accordance with claim 1, wherein said probe holder assembly further comprises a base oriented to support said passage, a pair of legs extending from said base, and at least one magnetic portion configured to magnetically couple said probe holder assembly to the casing.

3. A system in accordance with claim 1, wherein said probe holder assembly further comprises an L-shaped cover, said L-shaped cover comprising a magnetic portion configured to removably couple said probe assembly to said probe holder assembly, said passage extending through said L-shaped cover.

4. A system in accordance with claim 2, wherein said base and said pair of legs are coupled to form a generally U-shaped planform, said probe holder assembly is configured to be clamped to the casing.

5. A system in accordance with claim 1, wherein said probe assembly further comprises wiring coupled to said probe, said wiring configured to transfer electromagnetic energy to said probe, said probe emitting the electromagnetic energy from an end top of said probe, said probe comprises a straight path from the electric wiring to the probe end tip such that a path of the electromagnetic energy does not bend more than 90°.

6. A system in accordance with claim 5, wherein said probe holder assembly further comprises a substantially planar back surface defining a first end of said passage and being oriented acutely relative to said bottom surface, said longitudinal axis is substantially perpendicular to said back surface.

7. A system in accordance with claim 1, wherein said probe holder assembly further comprises a substantially planar front surface segment, and a front edge coupling said bottom surface to said front surface segment, said front surface segment oriented acutely relative to said bottom surface at said front edge to facilitate aligning said front edge with the turbine casing inner surface.

8. A method for use in assembling a blade tip clearance inspection system for a turbine after a top portion of a turbine casing is removed, said method comprising:

providing a probe holder assembly including a substantially planar bottom surface and a passage oriented such that its longitudinal axis is oblique relative to said bottom surface;

providing a probe assembly including an electromagnetic probe, wherein the electromagnetic probe is sized to be inserted into the passage and is configured to emit electromagnetic energy from the passage during a blade tip clearance inspection; and removably coupling the probe holder assembly to an upper surface of the turbine casing such that the bottom surface is substantially coplanar with the casing upper surface to enable the electromagnetic probe to inspect the blade tip clearance.

9. A method in accordance with claim 8, wherein providing a probe holder assembly further comprises providing the probe holder assembly with a base that supports the passage, a pair of legs that extend from the base, and a magnetic portion, said removably coupling the probe holder assembly to a casing comprising magnetically coupling the probe holder assembly to the casing using the magnetic portion.

10. A method in accordance with claim 8, wherein providing a probe holder assembly further comprises providing the probe holder assembly with an L-shaped cover having a magnetic portion, the passage extending through the L-shaped cover, said method further comprising magnetically coupling the probe assembly to the probe holder assembly using the magnetic portion.

11. A method in accordance with claim 9, wherein providing a probe holder assembly further comprises providing the pair of legs coupled to the base to form a generally U-shaped planform, said removably coupling the probe holder assembly to a casing comprising clamping the probe holder assembly to the casing using at least one of the legs.

12. A method in accordance with claim 8, further comprising electrically coupling a wiring to the probe to transfer electromagnetic energy to the probe, the probe emitting the electromagnetic energy from an end tip of the probe, wherein the probe includes a straight path from the electric wiring to the probe end tip such that a path of the electromagnetic energy does not bend more than 90°, said method further comprising removably inserting the probe assembly into the passage of the probe holder assembly.

13. A method in accordance with claim 12, wherein said removably inserting the probe assembly into the passage of the probe holder assembly comprising inserting the probe assembly into the passage such that the probe is acutely oriented relative to the bottom surface of the probe holder assembly.

14. A method in accordance with claim 8, wherein the turbine casing has an inner surface, said providing a probe holder assembly comprising providing the probe holder assembly with a substantially planar front surface segment, and a front edge coupling the bottom surface to the front surface segment, wherein the front surface segment is oriented acutely relative to the bottom surface at the front edge, said method further comprising aligning the probe holder assembly with the inner surface using the front edge.

* * * * *